(12) United States Patent
Ma

(10) Patent No.: US 11,454,041 B2
(45) Date of Patent: Sep. 27, 2022

(54) ENCLOSURE STRUCTURE, AND AERODYNAMIC CONFIGURATION ADJUSTER ARRANGED ON OUTER SURFACE OF SAME

(71) Applicant: BEIJING GOLDWIND SCIENCE & CREATION WINDPOWER EQUIPMENT CO., LTD., Beijing (CN)

(72) Inventor: Shengjun Ma, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 81 days.

(21) Appl. No.: 17/043,522

(22) PCT Filed: Oct. 23, 2018

(86) PCT No.: PCT/CN2018/111364
§ 371 (c)(1),
(2) Date: Sep. 29, 2020

(87) PCT Pub. No.: WO2019/242179
PCT Pub. Date: Dec. 26, 2019

(65) Prior Publication Data
US 2021/0017784 A1 Jan. 21, 2021

(30) Foreign Application Priority Data
Jun. 21, 2018 (CN) .......................... 201810646401.2

(51) Int. Cl.
*F03D 7/02* (2006.01)
*E04H 12/34* (2006.01)
*F03D 13/20* (2016.01)

(52) U.S. Cl.
CPC ......... *E04H 12/342* (2013.01); *F03D 7/0296* (2013.01); *F03D 13/20* (2016.05);
(Continued)

(58) Field of Classification Search
CPC .......... F03D 7/0296; F03D 13/20; E04B 1/98; F05B 2260/96; F05B 2260/964; F05B 2240/912; E04H 12/342
(Continued)

(56) References Cited

U.S. PATENT DOCUMENTS 9,416,557 B2 * 8/2016 Moeller .................. E04H 12/00
9,534,415 B2 * 1/2017 Moeller ................ E04H 12/344
(Continued)

FOREIGN PATENT DOCUMENTS

CN     103114659 A     5/2013
CN     204174521 U     2/2015
(Continued)

OTHER PUBLICATIONS

M.M. Zdravkovich; "Review and Classification of Various Aerodynamic and Hydrodynamic Means for Suppressing Vortex Shedding," Journal of Wind Engineering and Industrial Aerodynamics, 7 (1981) 145-189.
(Continued)

*Primary Examiner* — Andrew J Triggs

(57) ABSTRACT

An enclosure structure, and an aerodynamic configuration adjuster arranged on an outer surface of same are provided. The aerodynamic configuration adjuster is of a grid structure capable of surrounding the enclosure structure, and the grid structure comprises a plurality of grid cells, at least some of grid cells have bevel edges, and the attack angle of a fluid is changed when the fluid passes over the bevel edges. The aerodynamic configuration adjuster changes the aerodynamic configuration of the fluid, and thus the resistance
(Continued)

coefficient becomes smaller such that a pressure differential between the pressures at a incident flow surface and a back surface of the enclosure structure is reduced, thereby reducing a forward resistance; and in addition, due to a smaller resistance coefficient, the amplitude of a transverse vortex-induced resonance can also be reduced, thereby reducing vibration.

17 Claims, 13 Drawing Sheets

(52) U.S. Cl.
CPC ..... *F05B 2240/912* (2013.01); *F05B 2260/96* (2013.01); *F05B 2260/964* (2013.01)

(58) Field of Classification Search
USPC ............................................................ 52/84
See application file for complete search history.

(56) References Cited

U.S. PATENT DOCUMENTS

| | | | |
|---|---|---|---|
| 9,567,745 B2* | 2/2017 | Moeller | F03D 13/40 |
| 10,294,924 B2* | 5/2019 | Altmikus | F03D 1/06 |
| 10,808,683 B2* | 10/2020 | Jensen | F03D 80/00 |
| 2014/0007523 A1* | 1/2014 | Fairbairn | F15D 1/10 52/84 |
| 2015/0361951 A1 | 12/2015 | Zamora Rodriguez | |
| 2015/0361958 A1* | 12/2015 | Wood | F03D 13/20 416/1 |
| 2016/0160499 A1 | 6/2016 | Moeller et al. | |
| 2017/0016428 A1 | 1/2017 | Altkimus et al. | |
| 2021/0017784 A1* | 1/2021 | Ma | F03D 80/00 |

FOREIGN PATENT DOCUMENTS

| | | |
|---|---|---|
| CN | 105934581 A | 9/2016 |
| CN | 107956650 A | 4/2018 |
| DE | 102014201507 A1 | 7/2015 |
| EP | 3029313 A | 8/2016 |
| EP | 2816177 B1 | 9/2017 |

OTHER PUBLICATIONS

The Extended European Search Report dated Jul. 16, 2021; Appln. No. 18923116.0.
International Search Report dated Mar. 21, 2019; PCT/CN2018/111364.
The First Indian Office Action dated Dec. 31, 2021; Appln. No. 202017049234.

\* cited by examiner

ENCLOSURE STRUCTURE, AND AERODYNAMIC CONFIGURATION ADJUSTER ARRANGED ON OUTER SURFACE OF SAME

The present application is a National Phase entry of PCT Application No. PCT/CN2018/111364, filed on Oct. 23, 2020, which claims the priority to Chinese patent application No. 201810646401.2 titled "ENCLOSURE STRUCTURE, AND AERODYNAMIC CONFIGURATION ADJUSTER ARRANGED ON OUTER SURFACE OF SAME", filed with the China National Intellectual Property Administration on Jun. 21, 2018, which are incorporated herein by reference in their entireties.

FIELD

The present application relates to the technical field of enclosure structures, and in particular to an enclosure structure and an aerodynamic configuration adjuster arranged on an outer surface of the enclosure structure.

BACKGROUND

Referring to FIG. 1-1, FIG. 1 is a schematic view of the composition of a wind power generation equipment.

A basis of the wind power generation equipment is a tower 10, which supports and encloses the whole equipment. As an example, taking a tower 10 with a circular cross-section as an example, the tower 10 may be a steel cylinder or a combination of a steel cylinder and a concrete tower. The tower 10 supports a nacelle 30, a generator, and an impeller 20 of the wind power generation equipment.

The tower 10 also bears the structural wind load generated by the nacelle 30, the impeller 20, and the generator, or the resulting downwind and crosswind vibrations, that is, a problem of wind-induced structural vibration.

Referring to FIG. 1-2, FIG. 1-2 is a schematic view of a tower assembled in sections.

At present, the tower 10 is generally assembled in sections. As shown in FIG. 2, the first tower section 11, the second tower section 12, the third tower section 13, the fourth tower section 14, and the fifth tower section 15 are provided from bottom to top. During the assembly of the wind power generation equipment, the first tower section 11 is first mounted on a foundation 90 of the tower 10, and then the other tower sections are hoisted and assembled section by section. After the tower sections being connected to each other, the top of the tower 10 (the fifth tower section 15 in FIG. 2) is connected to a yaw system of the nacelle 30, the nacelle 30 is docked with the generator, and the generator (or gearbox) is docked with the impeller 20.

The specific hoisting process is as follows.

Before the tower 10 is assembled, a foundation ring of the foundation 90 connected to the first tower section 11 is cleaned, the multiple bolts (such as 120) are greased at the threads and then placed in the inner ring of the foundation ring, and a control cabinet of the wind power generation equipment is hoisted into the foundation ring.

A lifting sling is mounted on the upper end of the first tower section 11, and a main crane is responsible for hoisting the upper end of the first tower section 11. At the same time, another lifting sling is mounted on the lower end of the first tower section 11, and an auxiliary crane is responsible for hoisting, and the two cranes hoist at the same time. When the height of the first tower section 11 is greater than the maximum diameter of the first tower section 11, the main crane hoists the upper end of the first tower section 11 and the auxiliary crane stops; and when the first tower section 11 is hoisted to a vertical ground position, the auxiliary crane is removed, and the lifting sling at the lower end of the first tower section 11 is removed.

After the flange surface of the first tower section 11 is connected, the bolts are threaded from bottom to top. When the nuts are mounted, the bolts are tightened with an electric wrench, and the nuts are tightened at least 3 times (after the hoisting process of the whole wind power generation equipment is completed, the connecting nuts of the tower are tightened to the required torque value by using torque wrench).

The hoisting process of the remaining tower sections is the same as that of the first tower section 11. After the uppermost tower section is hoisted, the nacelle is prepared to be hoisted.

The mounting processes of the above docking and connection are all carried out under the condition that the local wind in a small area of a wind farm is unpredictable. Therefore, during the hoisting and assembling process, changing gusts or continuous small winds are often encountered. As mentioned above, these gusts or continuous winds may induce vibration to the tower, destroy the stability of the enclosure structure, endanger the safety of the personal and the equipment and delay the mounting period. For example, after the fourth tower section 14 is hoisted, there is a vibration in the fourth tower section 14, which causes the fifth tower section 15 to be out of alignment; even, the tightened bolts may break under the vibration, causing a safety problem.

At present, the engineering safety requirements of the wind power industry hoisting process clearly stipulate: the hoisting of the blade group is prohibited when the wind speed is greater than 6 m/s; the hoisting of the nacelle is strictly prohibited when the wind speed is greater than 8 m/s; the hoisting of the tower is strictly prohibited when the wind speed is greater than 10 m/s. It can be seen that the on-site hoisting progress and mounting period are obviously restricted by the wind conditions in some areas. For the construction of the wind farms in the high-altitude and high-mountain area, the construction period is even more susceptible.

Referring to FIGS. 2-1 to 2-6, FIGS. 2-1 to 2-6 are the schematic views of relationships between a cylindrical vortex shedding (flow shedding) and Reynolds number in six regions. In FIG. 2-1 to FIG. 2-6, the six regions of Reynolds number (Re) are Re<5, 5<Re<40, 40<Re<150, 150<Re<3×$10^5$, 3×$10^5$<Re<3×$10^6$, and Re>3×$10^6$.

According to the different airflow patterns around the structure of the object, the structure is divided into a bluff body and a streamlined body like a wing of an aircraft or a sail.

When Re<5, the flow of the fluid adheres to the whole surface of the cylinder, that is, the flow does not separate.

When 5<Re<40, the flow is still symmetrical, but there is a flow separation, and two symmetrically arranged stable vortices are formed on the leeward surface. As the Reynolds number increases, the vortices stretch out and become deformed.

When 40<Re<150, starting from the Reynolds number Re=40, the vortex will alternately shed behind the surface of the cylinder and flow into the fluid near the back of the cylinder to form a shear layer. The unstable shear layer will soon become a vortex, the vortex flows downstream, forming Karman vortex street, that is, vortex-induced vibration. The vortex shedding at this time is regular and periodic.

When 150<Re<300, it is a transition period from the laminar flow to the turbulent flow. At this time, the periodic vortex shedding is covered by the irregular turbulent flow.

When $300<Re<3\times10^5$, it is called a subcritical region. After separation, the wake of the cylinder mainly appears as a turbulent wake, and the vortex shedding begins to be irregular. The frequency period of the vortex shedding can be roughly determined, but the disturbance force during the vortex shedding will no longer be symmetrical, but random.

When $3\times10^5<Re<3\times10^6$, it is called a supercritical region, and the vortex shedding point moves backward, and the vortex street can no longer be recognized, and becomes a completely acyclic vortex.

When $3\times10^6<Re$, it is called a transcritical region, the wake behind the cylinder is very turbulent, but it shows a regular vortex shedding.

When a uniform airflow flows (sweeping, flowing around) through a bluff body (cylinder), the periodic vortex shedding generated behind the cross section of the cylinder will produce a periodically changing force-vortex force in the structure (contact surface of the tower surface). The lower end of the flowed around tower structure and the underground foundation form a single free-end vibration system (that is, the upper end of the tower is immersed in the airflow, and the lowermost end of the tower is fixed on the foundation). When the vortex shedding frequency is consistent with the self-vibration frequency of a certain order of the tower structure, the periodic vortex-induced force (unbalanced force) on the tower surface will cause the vortex-induced vibration response of the tower structure.

The condition that the vortex shedding frequency is equal to the natural frequency of the tower of the structural system and the basic vibration system of the tower can be satisfied at a certain wind speed, but the tower and the basic vibration system with the natural frequency will produce some kind of feedback effect to the shedding of the vortex, so that the frequency of the vortex shedding is "captured" by the vibration frequency of the tower and the basic vibration system within a certain wind speed range, which makes the frequency of the vortex shedding not change with the change of wind speed within a certain wind speed range. This phenomenon is called locking, which expands the wind speed range of the tower structure subjected to the resonance caused by the vortex excitation.

The tower height of modern large-scale MW wind turbines can be up to 60 to 100m. The top of the tower 10 is equipped with main parts such as a main frame, an auxiliary frame, a hub and blades (i.e., impeller 20). When the wind turbine is in operation, besides the gravity generated by the top part and the dynamic load generated by the rotating wind wheel, the tower 10 is also subjected to the action of the natural wind, including two modes of action in the downwind and crosswind directions. When the wind blows the impeller to rotate, bending moment and force will be generated on the tower, and this bending moment and force generated along the downwind direction is the main reason for the destruction of the tower 10. The vortex generated when the wind bypasses the tower 10 may also cause transverse vibrations, which may cause the resonance damage of the tower 10.

When the wind blows through the tower 10, a pair of alternately arranged and anti-symmetrical vortices with opposite rotation directions are generated on the left and right sides of the wake, that is, Karman vortices. The vortex sheds from the tower 10 at a certain frequency, causing the tower 10 to produce transverse vibration perpendicular to the wind direction, also known as wind-induced transverse vibration, that is, vortex-induced vibration. When the shedding frequency of the vortex is close to the natural frequency of the tower, the tower 10 is susceptible to resonance, and then is damaged.

In view of this, how to improve the situation where the assembly of the wind power generation equipment is restricted by regional wind conditions is a technical problem urgently needed to be solved by those skilled in the art.

SUMMARY

An aerodynamic configuration adjuster arranged on an outer surface of an enclosure structure is provided according to the present application, where the aerodynamic configuration adjuster has a grid-like structure configured to surround the enclosure structure, the grid-like structure includes multiple grid cells, at least part of the grid cells have an oblique side, and an attack angle changes when a fluid passes through the oblique side.

In an embodiment, the aerodynamic configuration adjuster includes multiple layer of vertically distributed adjustment grid layers, the adjustment grid layers are configured to surround the enclosure structure, the adjustment grid layers include multiple grid cells, the grid cells have the oblique side, and the adjustment grid layers have multiple oblique sides with a same oblique direction and a same length, and when the fluid passes through the multiple oblique sides, the aerodynamic configuration is approximately of an elliptical shape.

In an embodiment, each grid cell in a same adjustment grid layer has a same shape and size; or each grid cell in all the adjustment grid layers has a same shape and size.

In an embodiment, each grid cell of the adjustment grid layers is of an isosceles triangle shape, and each of the adjustment grid layers is formed by connecting a normal isosceles triangle grid cell and an inverse isosceles triangle grid cell in sequence; or, each grid cell of the adjustment grid layers is of a parallelogram shape, and each of the adjustment grid layers is formed by connecting multiple parallelogram grid cells with a same oblique direction; or, each grid cell of the adjustment grid layers is of a rhombus shape, and each of the adjustment grid layers is formed by connecting multiple rhombic grid cells.

In an embodiment, the aerodynamic configuration adjuster further includes at least one decoupling grid layer, and the decoupling grid layer is provided between two adjustment grid layers in an upper and lower direction;

the at least one decoupling grid layer includes multiple non-isosceles triangle grid cell groups, and each of the non-isosceles triangle grid cell groups includes two non-isosceles triangle grid cells with a same shape whose vertex angles are opposite; a base of each non-isosceles triangle is a base of the corresponding grid cell of the adjacent adjustment grid layer; and a non-equilateral quadrilateral grid cell is formed between two adjacent non-isosceles triangle grid cell groups.

In an embodiment, in the decoupling grid layer, the vertex angles of the two non-isosceles triangle grid cells of each non-isosceles triangle grid cell group form a node, the nodes of multiple groups of the non-isosceles triangle grid cell groups are connected, and a connected grid line is provided with a trip ball in the non-equilateral quadrilateral grid cell.

In an embodiment, in the two adjacent adjustment grid layers arranged in an upper and lower direction, the parallelogram grid cells are arranged inversely.

In an embodiment, all the grid cells in the adjustment grid layers are the same, and the aerodynamic configuration adjuster further includes at least one decoupling grid layer, the decoupling grid layer is provided between the upper and lower adjustment grid layers, and a shape of each grid cell in the at least one decoupling grid layer is different from a shape of each grid cell in the adjustment grid layers.

In an embodiment, the grid-like structure is provided with multiple nodes, and each of the nodes (50a) is a ball or a semi-spherical ball or a rugby ball facing outward, forming a trip ball.

In an embodiment, a cross section of grid lines of the grid-like structure is of a quadrilateral or a circle shape.

In an embodiment, the grid-like structure is a flexible or elastic grid, which is stretchable in a height direction, to change a height of each grid cell and a cross-sectional area of the grid lines of the grid-like structure.

In an embodiment, a pulling ring configured to surround the enclosure structure is provided at a base or a top side of the grid-like structure for pulling the grid cell and adjusting the height of each grid cell.

In an embodiment, the grid-like structure is formed by weaving a wire rope, or by a molding process, or by 3D printing.

In an embodiment, the grid-like structure is detachably connectable after surrounding the enclosure structure.

An enclosure structure is provided according to the present application, at least part of an outer surface of the enclosure structure is provided with the aerodynamic configuration adjuster arranged on the outer surface of the enclosure structure according to any one of the above.

In an embodiment, the enclosure structure is a tower of a wind turbine, a television tower, an anemometer tower, or an aquatic building with an underwater part, or a land pillar pier, or a land pillar.

In an embodiment, a height of each grid cell gradually increases from top to bottom; and at least an outer surface of an upper part of the enclosure structure is provided with the aerodynamic configuration adjuster, and the upper part is located above ½ of a height of the tower.

In an embodiment, the enclosure structure is the tower of the wind turbine and a height of the aerodynamic configuration adjuster is not less than a length of a blade.

According to the present application, the aerodynamic configuration adjuster is arranged on the outer surface of the enclosure structure, which can produce the following technical effects.

1. The aerodynamic configuration adjuster can change the attack angle of the fluid and change the aerodynamic configuration formed by the fluid flowing around the outer surface of the enclosure structure. After the fluid flows toward the back of the enclosure structure, the running path is elongated, tends to converge toward the back and slowly changes, making the resistance coefficient smaller.

As the resistance coefficient is reduced, the pressure difference between a facing flow surface and a back surface of the enclosure structure will be reduced, thereby reducing the forward resistance, reducing the amplitude and meeting the requirements of the stability and the safety of the load-bearing enclosure structure. The effect is especially obvious when the fluid velocity is high.

2. The fluid coefficient becomes smaller, which can reduce the amplitude A of the transverse vortex-induced resonance and reduce the vibration. The effect is more obvious when the fluid velocity is relatively low.

BRIEF DESCRIPTION OF THE DRAWINGS

FIG. 1-2 is a schematic view of a tower assembled in sections;

FIGS. 2-1 to 2-6 are the schematic views of relationships between a cylindrical vortex shedding (flow shedding) and Reynolds number in six regions;

FIG. 3 is a schematic view of an embodiment of an aerodynamic configuration adjuster attached to an outer surface of an enclosure structure according to the present application;

FIG. 4 is a schematic view of the tower section provided with the aerodynamic configuration adjuster in FIG. 3;

FIG. 5 is an enlarged schematic view of a part of a grid structure in FIG. 4;

FIG. 6 is a working principle diagram of an aerodynamic configuration adjuster with multiple grid cells of a isosceles triangle shape;

Figure 1:
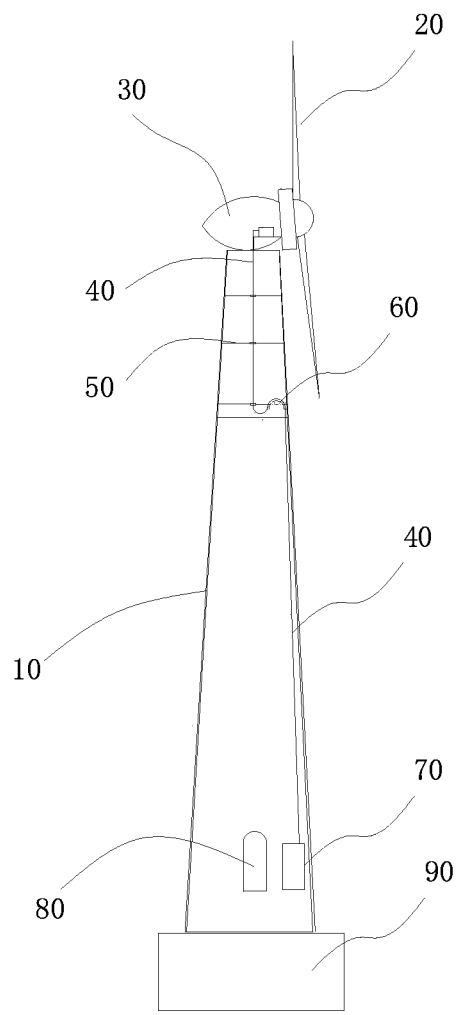
FIG. 1-1 is a schematic view of the composition of a wind power generation equipment.
Figures 1, 2:
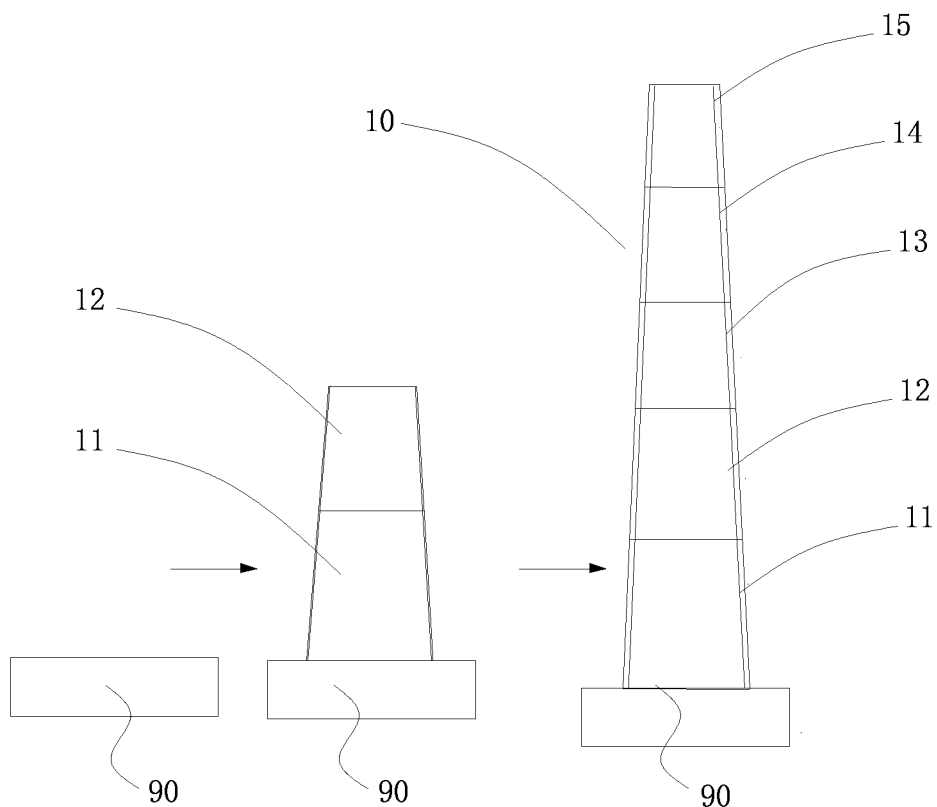
Figures 1, 2:
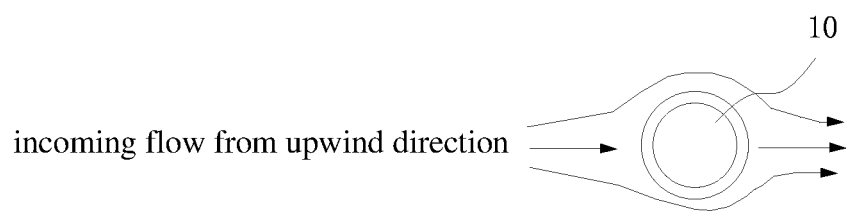
Figure 2:
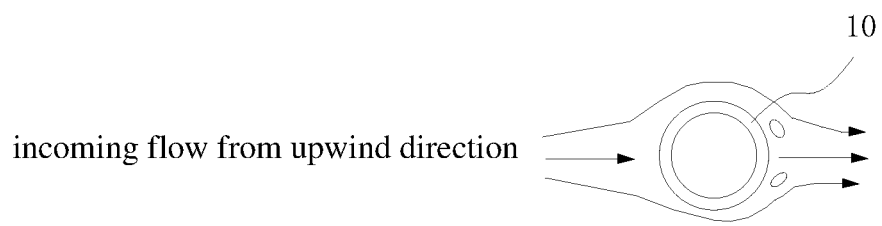
Figures 2, 3:
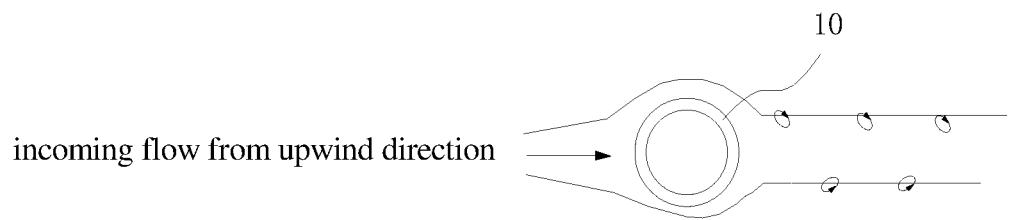
Figures 2, 3, 4:
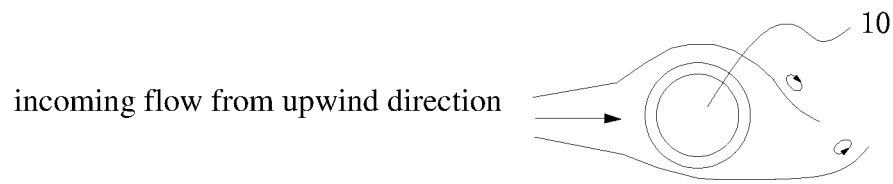
Figures 2, 3, 4, 5:
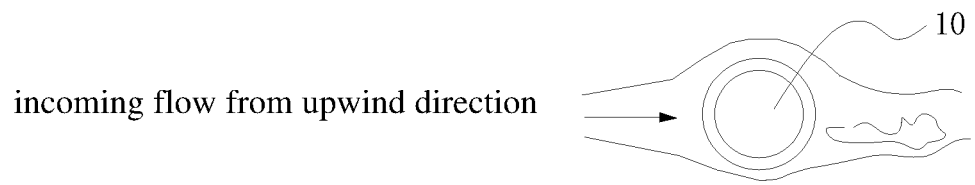
Figures 2, 3, 4, 5, 6:
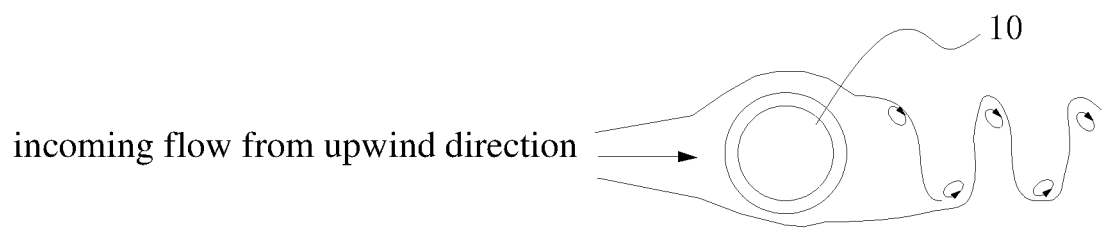
Figure 3:
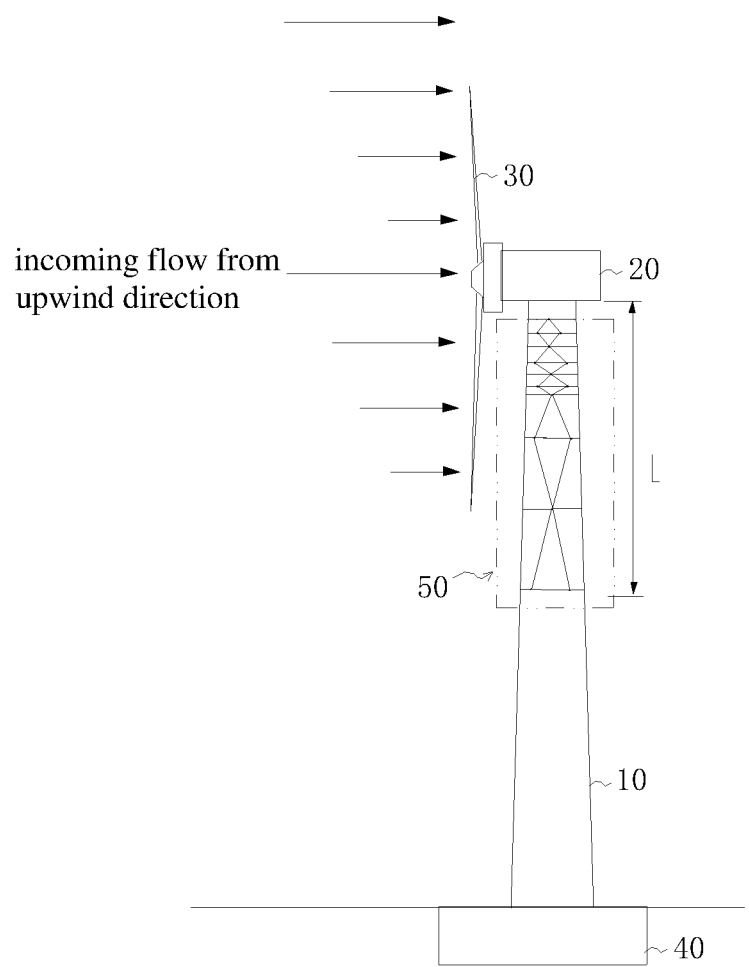
Figure 4:
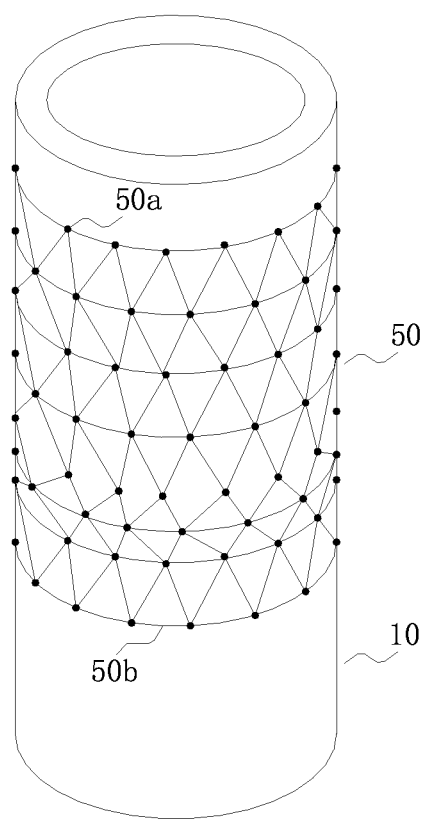
Figure 5:
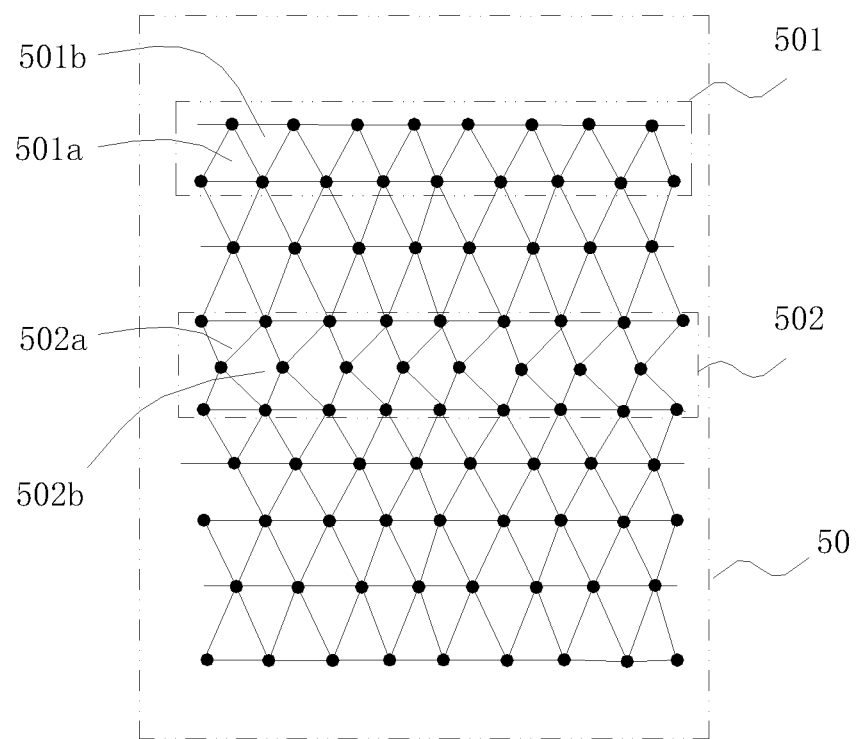
Figure 6:
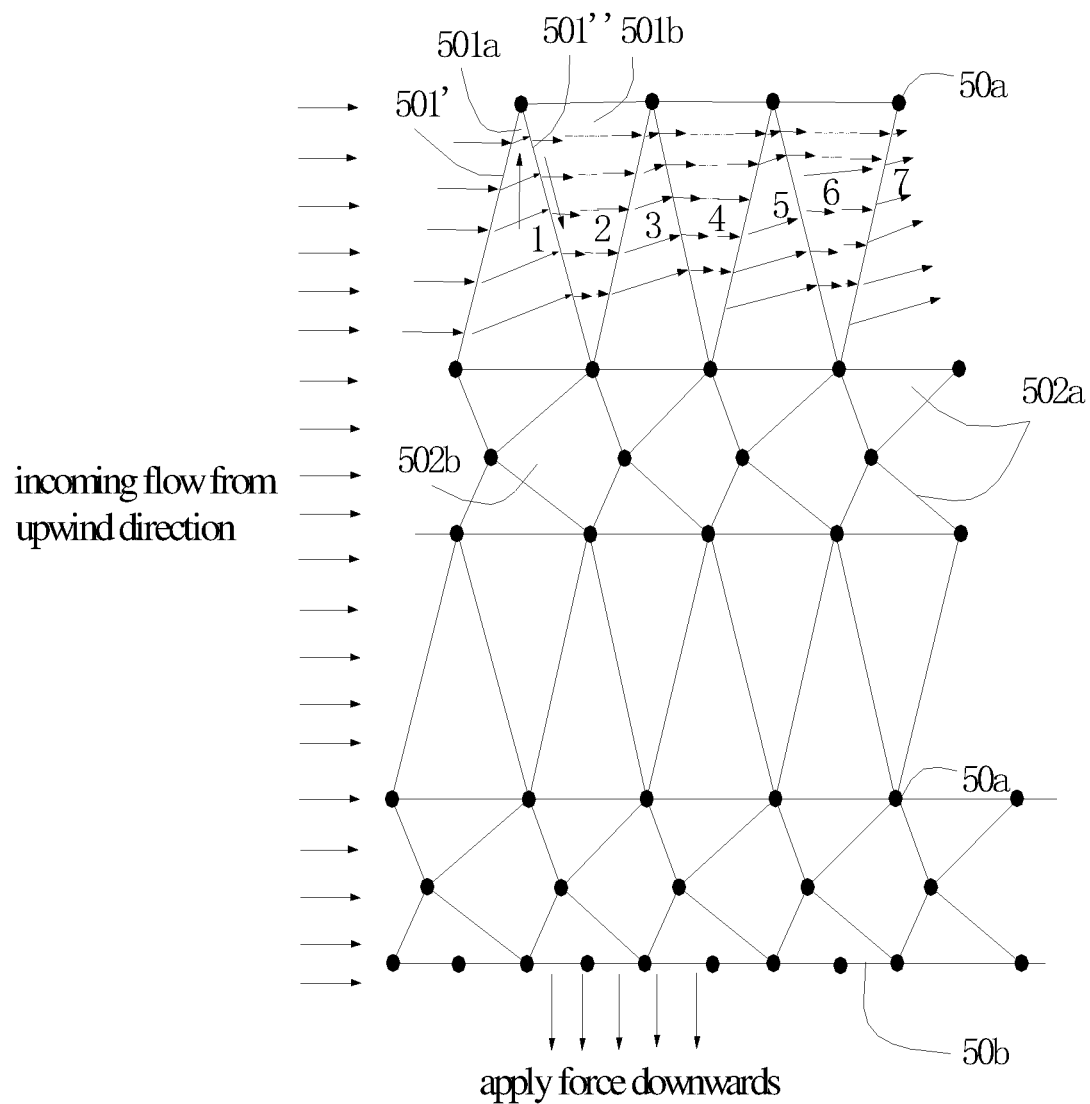

REFERENCE NUMERALS IN FIGS. 1 to 2-6.

| | |
|---|---|
| 10 tower, | 11 first tower section, |
| 12 second tower section, | 13 third tower section, |
| 14 fourth tower section, | 15 fifth tower section, |
| 10a helix, | 20 wind turbine, |
| 30 nacelle, | 40 power transmission cable, |
| 50 fixing plate of cable retaining ring, | 60 saddle surface bracket, |
| 70 converter cabinet, | 80 tower door, |
| 90 foundation. | |

REFERENCE NUMERALS IN FIGS. 3 to 13.

| | |
|---|---|
| 10 tower, | 20 nacelle, |
| 30 impeller, | 40 foundation, |
| 50 aerodynamic configuration adjuster, | 501 adjustment grid layer, |
| 501a normal isosceles triangle grid cell, | |
| 501b inverse isosceles triangle grid cell, | |
| 501' downwind oblique trip line, | 501" upwind oblique trip line, |

-continued

| | |
|---|---|
| 501c parallelogram grid cell, | 501d rhombic grid cell, |
| 502 decoupling grid layer, | 502a non-isosceles triangular grid cell, |
| 502b non-equilateral quadrilateral grid cell, | |
| 50a node, | |
| 50b pull ring. | |

DETAILED DESCRIPTION

In order to make those skilled in the art to better understand the technical solutions of the present application, the present application is further described in detail below in conjunction with the drawings and the embodiments.

Referring to FIG. 3, FIG. 3 is a schematic view of an embodiment of an aerodynamic configuration adjuster attached to an outer surface of an enclosure structure according to the present application, the enclosure structure is specifically illustrated in FIG. 2 as a tower 10 of a wind turbine, and other types of the enclosure structures will be exemplified below. For simplicity of description, the tower 10 is taken as an example for illustration below.

In this embodiment, a nacelle 20 is provided on a top of the tower 10. A generator and a prime mover are mounted in an upwind direction of the nacelle 20. The prime mover is a wind turbine, the wind turbine includes an impeller 30, and a bottom of the tower 20 is mounted on a foundation 40. In addition, an aerodynamic configuration adjuster 50 is arranged on an outer surface of the tower 10, which is a grid-like structure surround the enclosure structure and attached to the outer surface of the enclosure structure. The grid-like structure includes multiple grid cells, and at least part of the grid cells each has an oblique side, and the attack angle may be changed when the incoming flow from the upwind direction passes through the oblique side. The cross-section of the grid lines of the grid-like structure may be a circle or a quadrilateral, and the oblique side is one or more grid lines in the grid cells.

Referring to FIGS. 4 and 5, FIG. 4 is a schematic view of the tower section provided with the aerodynamic configuration adjuster in FIG. 3; and FIG. 5 is an enlarged schematic view of a part of the grid structure in FIG. 4, and the grid structure is shown in a flat state.

As shown in FIGS. 4 and 5, the aerodynamic configuration adjuster 50 includes multiple layers of vertically arranged adjustment grid layers 501, that is, multiple layers of the adjustment grid layers 501 are arranged along the vertical direction. The adjustment grid layer 501 is composed of multiple grid cells at approximately the same height, so it is called a "layer". The adjustment grid layers 501 may be in the transverse direction, that is, when the enclosure structure is upright, the adjustment grid layers 501 are in the horizontal direction, and when the enclosure structure is the tower 10, the transverse direction is the direction perpendicular to the axial direction of the tower 10. Obviously, the transverse adjustment grid layers 501 surround transversely and are attached to the outer surface of the tower 10. Of course, in this solution, the adjustment grid layers 501 are not limited to be in an absolute horizontal direction, and may be set in a certain angle.

In addition, each grid cell of the adjustment grid layers 501 has the same shape, and each grid cell of the adjustment grid layers 501 has the oblique side. Herein, the inclination of the oblique side is relative to the horizontal or vertical direction when the enclosure structure is upright, so that the attack angle may be changed when the incoming flow from the upwind direction passes through the oblique side.

Specifically, each grid cell of the adjustment grid layers 501 is an isosceles triangle with equal side lengths, and each of the adjustment grid layers 501 is formed by connecting a normal isosceles triangle grid cell 501a and an inverted isosceles triangle grid cell 501b in sequence. The normal isosceles triangle has an apex angle facing upwards, and the inverted isosceles triangle has an apex angle facing downwards. The "connecting" described here is to facilitate understanding of the positional relationship between two adjacent isosceles triangular grid cells, and does not limit the two grid cells to be connected by a connecting member. The grid-like structure may be an integrated structure.

Referring to FIG. 6, FIG. 6 is a working principle diagram of an aerodynamic configuration adjuster with isosceles triangle grid cells, and black arrows mainly show the flow path of the airflow.

The uppermost layer in FIG. 6 is the transverse adjustment grid layer 501. From left to right, the normal isosceles triangle grid cells 501a and the inverse isosceles triangle grid cells 501b are arranged in sequence, and two adjacent grid cells share one oblique side, of course, or also maybe two separate oblique sides. The left waist (left oblique side) of the isosceles triangle is inclined from left to upper right, and the right waist (right oblique side) of the isosceles triangle is inclined from left to lower right. Here, the left waist of the normal isosceles triangle (ie the right waist of the inverted isosceles triangle) is defined as the oblique trip line 501' along the downwind direction, and the right waist (ie the left waist of the inverted isosceles triangle) is defined as the oblique trip line 501" along the upwind direction.

In FIG. 6, taking the incoming flow from the upwind direction as an example, when the airflow flows around the tower 10 from left to right, the process is as follows.

a. The airflow first passes through the left waist of the leftmost isosceles triangle grid cell 501a, that is, the airflow passes through the oblique trip line 501' along the downwind direction. Since the oblique trip line 501' along the downwind direction is inclined to the upper right, when the airflow reaches here, the direction of the reaction force when the oblique trip line 501' along the downwind direction blocks the airflow is the upper left direction, and the attack angle will be changed by the oblique trip line 501' along the downwind direction, which changes from horizontal to upper right, that is, the leftmost oblique trip line 501' along the downwind direction changes the local aerodynamic configuration.

b. The direction of the airflow is changed to the upper right, and enters to the leftmost isosceles triangle grid cell 501a. The airflow will have a congestion effect at the top of the isosceles triangle grid cell 501a. As the airflow continues to flow to the right, the airflow will again encounter the right side waist of the leftmost isosceles triangle grid cell 501a, that is, the airflow passes through the oblique trip line 501" along the upwind direction, the direction of the reaction force when the oblique trip line 501" along the upwind direction blocks the airflow is the lower right direction, and the airflow raised to the upper right is pulled back to a substantially horizontal direction. As shown in FIG. 6, the airflow direction in the leftmost isosceles triangle grid cell 501*a* is raised to the upper right, and the airflow direction entering to the first inverted isosceles triangle grid cell 501*b* on the left is changed to the horizontal direction.

c. The airflow enters into the second isosceles triangle grid cell 501*a* on the left side in a substantially horizontal direction, and circulates sequentially according to the flow paths of a and b above.

Figure 7:
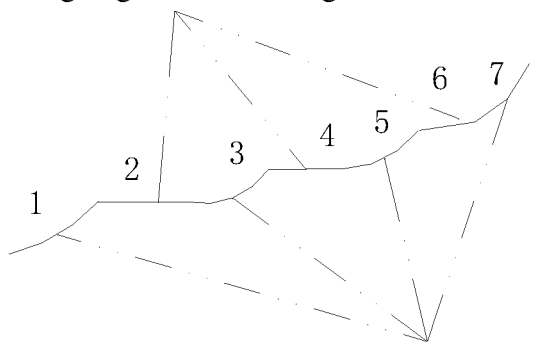
FIG. 7 is a path line view of a part of the airflow after passing through the multiple grid cells in FIG. 6.
Figure 8:
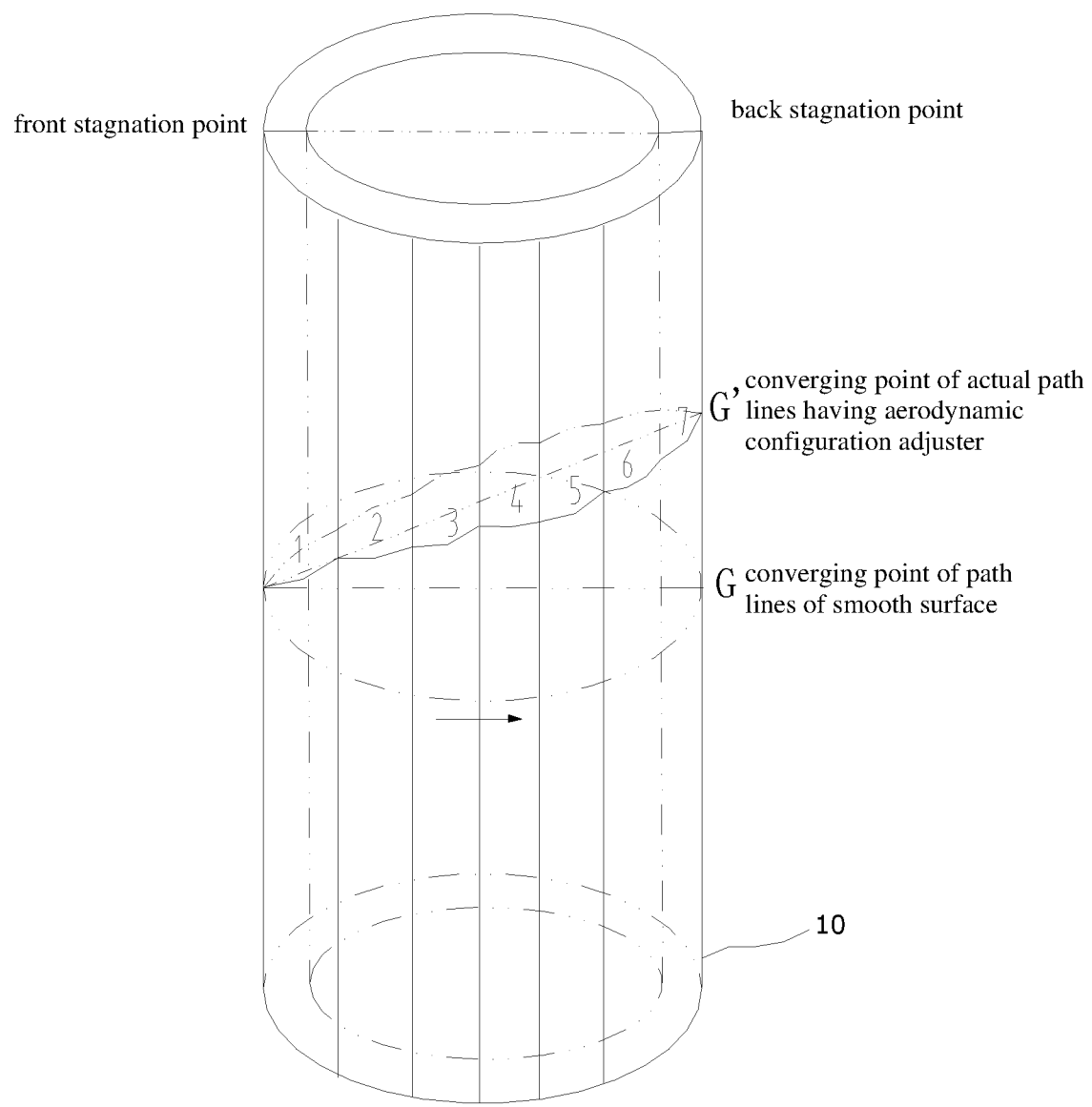
FIG. 8 is a schematic view of a complete path line of a part of the airflow after passing through multiple grid cells in FIG. 6.

In order to make the airflow path more clearly, as an example, in FIGS. 7 and 8, the numbers 1, 2, 3, 4, 5, 6, and 7 are used for tracking and marking the path of a part of the airflow after the airflow passing through each isosceles triangle.

Referring to FIGS. 7 and 8, FIG. 7 is a path line view of a part of the airflow after passing through multiple grid cells in FIG. 6; and FIG. 8 is a schematic view of a complete path line of a part of the airflow after passing through multiple grid cells in FIG. 6.

As can be seen from FIGS. 7 and 8, due to the arrangement of the adjustment grid layer 501, the aerodynamic configuration is adjusted to be approximately elliptical, that is, a circular path line composed of multiple elliptical segments and circular arc segments. The circular path line is symmetrical from the windward surface to the leeward surface, and the path is a curve composed of continuous curve segments. The curve segments of 1, 3 and 5 rise and the attack angle is positive, the height rising of the curve segments of 2, 4 and 6 is not obvious, the vertical projections of the paths of 2, 4 and 6 are circular arc segments around the outer surface of the enclosure structure, and the curve segments of 1, 3, and 5 are elliptical arc segments that continuously rise in the height around the outer surface of the enclosure structure. The overall aerodynamic configuration is approximately elliptical. In FIG. 8, when the aerodynamic configuration adjuster 50 of this solution is not provided, the airflow flowing from a front stagnation point will transversely flow around the tower 10, the aerodynamic configuration is circular, and the converging point of the path lines is G point. However, after the aerodynamic configuration adjuster 50 is provided, the converging point of the actual path lines of the airflow at the same front stagnation point is G' point.

In this embodiment, each of the adjustment grid layers 501 has multiple isosceles triangles arranged in sequence, and each of the normal isosceles triangle grid cells 501*a* has an oblique trip line 501' along the downwind direction on the left waist with the same oblique direction and the same length, and the airflow flows gradually upward when passing, and the aerodynamic configuration is finally close to an ellipse shape; each of the inversed isosceles triangle grid cells 501*b* has an oblique trip line 501" along the upwind direction on the right waist with the same oblique direction and the same length, and the airflow flows gradually upward when reversely passing. The aerodynamic configuration is eventually also close to an ellipse shape. That is, along the circumferential direction, multiple oblique sides spaced apart and with the same oblique direction and the same length may be called a group of oblique sides. This group of the oblique sides allows the aerodynamic configuration when the airflow flows to change to an approximate ellipse (the aerodynamic configuration has part arc segments).

In order to allow the airflow in different directions to be changed when passing through the aerodynamic configuration, the adjustment grid layer 501 may be provided with another group of oblique sides with the same oblique direction and the same length. The oblique direction of this group of oblique sides is set opposite to the oblique direction of the previous group; or, the oblique angles of the oblique sides of different grid layers 501 may be different.

In the process of explaining the specific principle of the above aerodynamic configuration adjuster 50 capable of suppressing the vibration of the enclosure structure of the tower 10, professional terms such as "attack angle" and "aerodynamic configuration" will be involved, which will be explained together below.

Figure 9:
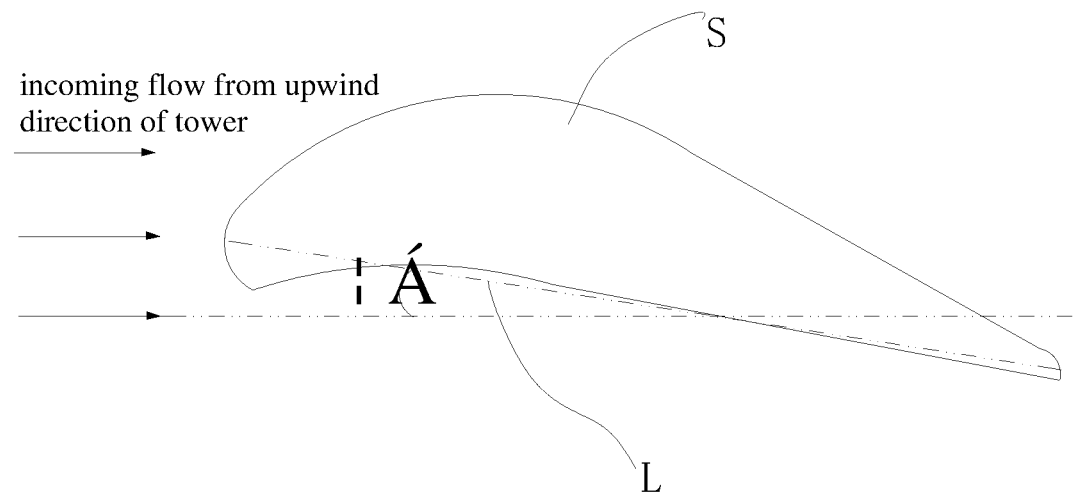
FIG. 9 is a schematic view of a wing-shaped attack angle.

The specific principle can be referred to FIG. 9 in conjunction with FIGS. 7 and 8, and FIG. 9 is a schematic view of a wing-shaped attack angle.

An attack angle, sometimes also called an incidence angle, is a term for fluid mechanics For the wing-shaped cross-section S, the attack angle α is defined as an angle between the wing chord L and the velocity of the upwind flow, and that a head is raised is considered as positive and that a head is lowered is considered as negative. As shown in FIG. 8, under the action of the oblique trip line along the downwind direction, the airflow inclined to the upper right forms a positive attack angle, and under the action of the oblique trip line along the upwind direction, the airflow is pulled back to the horizontal, in this way, the approximately elliptical aerodynamic configuration is correspondingly formed on the tower 10.

Aerodynamic configuration refers to an object moving in a fluid (gas, liquid) medium adopts a shape suitable for movement in the medium in order to reduce the resistance to the movement. That is, the aerodynamic configuration is an outer boundary formed by the path line of the fluid flowing through an outer surface of the solid material and formed along the flow direction to an appearance of the solid material. The aerodynamic configuration is mainly for the concept of missiles, aircrafts and other aircraft, this article is applied to the enclosure structure of the tower 10. Aerodynamic configuration specifically refers to a function composed of the direction and the magnitude of the hoisting force, the resistance force, the force received by the aircraft and missile in flight, and its own cross-section, length, push force, stability and other objective factors that will affect the flight of the flying object. The value of this function determines the configuration of the flying object.

When the direction of the incoming flow from the upwind direction changes, the aerodynamic configuration changes accordingly. When the direction of the incoming flow from the upwind direction is horizontal, the aerodynamic configuration is circular, as shown in FIG. 8, when the incoming flow from the upwind direction comes into contact with the tower 10 horizontally, the aerodynamic configuration is circular, which is a blunt body; when the fluid is inclined upward or downward, the aerodynamic configuration will be elliptical. The larger the attack angle is, the greater the ratio of the long and short axes of the ellipse is, and the more streamlined the aerodynamic configuration is.

It should be understood that, for the structure of the tower 10 immersed in the fluid, an unbalanced force is caused by the vortex of the airflow generated when the fluid (such as the airflow of the wind farm) flows through or sweeps the outer surface of the tower 10 structure alternately shedding from both sides of the tower 10 (belongs to a bluff body) to leave the surface of the tower 10, thus a transverse force pointing to the side of the tower 10 where the vortex sheds is produced, and in this way, the alternating shedding vortices force the structure of the tower 10 to vibrate, similar to a simple harmonic (that is, sinusoidal) crosswind direction (the upper and middle part of the tower 10 draw the lower part), which is called vortex-induced resonance. That is, the vortex-induced resonance is generated by the vibration induced by the Karman vortex street phenomenon mentioned in the background art.

When the vortex-induced resonance occurs in the structure of the tower 10, the vortex-induced force (ie, unbalanced force) acting on the outer surface of the structure of the tower 10 is approximately a simple harmonic force:

$$F(t) = F_0 \sin \omega t \quad (1)$$

where: ω(Re,St) is the frequency of vortex shedding, the whole of ωt is a variable;

Re is the Reynolds number and St is the Storoha number;

$F_0$ is the amplitude value of the vortex excitation force, $F_0 = (\rho U^2/2) CD$;

ρ is the density of the incoming flow from the upwind direction of the tower 10;

U is the wind speed of the incoming flow from the upwind direction of the tower 10;

C is the aerodynamic coefficient of the structural section of the tower 10; the aerodynamic coefficient is also called the wind carrier type coefficient, which is a ratio of the pressure (or suction) formed by the wind on the surface of the engineering structure and the theoretical wind pressure calculated according to the wind speed. It reflects the distribution of stable wind pressure on the surface of the engineering structure and the building, and varies with the shape, scale, shielding condition and airflow direction of the building; and D is the characteristic scale when the outer surface of the tower 10 structure is swept by the fluid or the characteristic scale of the spatial structure formed by the obstacle facing the fluid when the fluid passes through the obstacle and flows around the obstacle, which is a general term in the field of heat transfer. In this embodiment, it refers to the characteristic scale of the enclosure structure (in this case, it refers to the outer surface shape of the tower 10) and the fluid contact surface (in this case, it refers to the airflow), which is usually taken to be the width of the structure perpendicular to the wind direction, that is the outer diameter of the tower 10 at the corresponding height.

The transverse amplitude change of the tower 10 structure caused by the vortex excitation force is:

$$A(t) = \frac{\pi}{\delta} \frac{1}{K} (\rho U^2/2) CD \sin \omega t \quad (2)$$

where: K is the rigidity of the tower 10 structural system (which may include the cabin); and δ is the logarithmic decrement (approximately 0.05).

When the wind speed of the incoming flow from the upwind direction reaches a certain value and continues to act for a period of time, the vortex-induced resonance may occur in the structure of the tower 10, and the vibration amplitude A at this time is:

$$A = \frac{\pi}{\delta} \frac{\rho C f^2}{2K(St)^2} D^3 \quad (3)$$

It can be seen that when the cross-sectional size of the structure is fixed, the rigidity K may be increased or the damping may be increased to reduce the amplitude of the vortex-induced resonance.

In the above formula, $$St = \frac{fD}{U}$$

is the Strouhal number, and the definition of Storohal number describes the relationship between a vortex shedding frequency, a wind speed and a cylinder diameter, where: f is the frequency of vortex shedding, Hz ;

U is the wind speed of the incoming flow from the upwind direction of tower 10; and D is the characteristic scale when the outer surface of the tower 10 structure is swept by the fluid.

In this embodiment, D refers to the outer diameter of the tower 10 at different heights. The outer diameter may change. When the incoming flow from the upwind direction is not horizontal, but flows around the tower 10 at a certain angle, the path around the tower 10 will form an approximate ellipse shape, as described in the above aerodynamic configuration, and then the characteristic size D is the equivalent diameter of the aerodynamic configuration ellipse (the specific term in the heat transfer, and the diameter of a hypothetical circular section, that is, the diameter of a non-circular section converted into a circular section according to the circumference). At this time, the boundary wetted by or in contact with the fluid becomes more streamlined, away from passivation. In terms of vibration form, the vortex-induced resonance is a limiting vibration with the dual nature of self-excitation and forcing.

Figure 10:
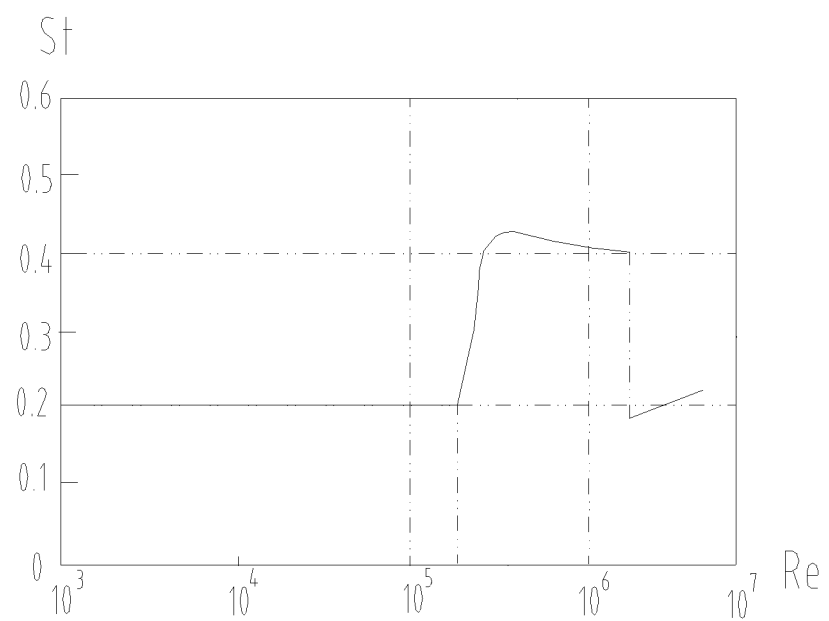
FIG. 10 is a schematic view of a relationship between the Storoha number and the Reynolds number on an outer surface of the tower.

The Storroha number may be obtained according to the Reynolds number, and the relationship between the Storroha number and the Reynolds number may refer to FIG. 10, which is a schematic view of a relationship between the Storoha number and the Reynolds number on an outer surface of the tower 10, the horizontal axis is the Reynolds number, and the vertical axis is the Stroha number. Before the Reynolds number reaches $2 \times 10^5$, the Storoha number is a constant 0.20; after that, as the Reynolds number increases, the Storoha number jumps to 0.30 first, then increases to 0.43, and then when the Reynolds number equals $2 \times 10^6$, the Storoha number drops to 0.2 again. Therefore, the Storoha number, D and U are all available parameters, and f may also be calculated according to the formula of the Storoha number, and accordingly, the amplitude A may also be calculated.

According to this, the above aerodynamic configuration adjuster 50 is arranged on the outer surface of the enclosure structure, which can produce the following technical effects.

1. As mentioned above, the aerodynamic configuration adjuster 50 changes the attack angle of the downwind boundary layer from the local details to the global by using the function of the trip line of the oblique side (or called the rib line, that is, the grid line of the grid structure) to change the aerodynamic configuration formed by the airflow flowing around the outer surface of the enclosure structure. After the fluid flows toward the leeward surface and downwind of the enclosure structure, the running path is elongated. The wind direction is instantaneously upward, instantaneously downward, and instantaneously upward again, and the curved sections wrap around the outer surface of the enclosure structure and move upwards and downwards along the height direction of the enclosure structure, and at the same time tend to converge towards the leeward surface and change slowly, making the resistance coefficient smaller.

It should be understood that when the aerodynamic configuration is adjusted to an ellipse shape, the resistance coefficient (aerodynamic coefficient C) will become smaller.

When the length ratio of the long and short axes of the ellipse is 2:1, the resistance coefficient will decrease to 0.6 or 0.46 according to the Reynolds number; when the length ratio is 4:1, the resistance coefficient will be reduced to 0.32 or 0.29; and when the length ratio is 8:1, the resistance coefficient will be reduced to 0.2. According to this solution, the aerodynamic configuration is adjusted to be approximately elliptical, and obviously the resistance coefficient will be reduced accordingly. As the resistance coefficient decreases, the pressure difference between the tower 10 on the windward surface and leeward surface will decrease, thereby reducing the downwind resistance, reducing the amplitude, and meeting the requirements of the stability and the safety of the load-bearing enclosure structure. The effect is especially obvious when the fluid velocity is high.

2. When the incoming flow from the upwind direction flows around the tower 10 and is in contact with the aerodynamic configuration adjuster 50, the local and global changes in the aerodynamic configuration are obtained, and after the flowing around airflow becoming streamlined, the aerodynamic coefficient C of the tower 10 becomes smaller (refer to the above point 1), according to the above formula (3), the amplitude A of the transverse vortex-induced resonance can also be reduced and the vibration can be reduced. The effect is more obvious when the wind speed is relatively low.

In the above embodiment, the grid cells of the grid layers 501 are adjusted, and in order to form the oblique side which can change the attack angle, an isosceles triangle is taken as an example for description. It can be understood that the grid cells with the oblique side may also have other shapes. For example, the grid cell may have a parallelogram shape, referring to FIG. 11, and FIG. 11 is a schematic view of an aerodynamic configuration adjuster 50 including parallelogram grid cells 501c.

Figure 11:
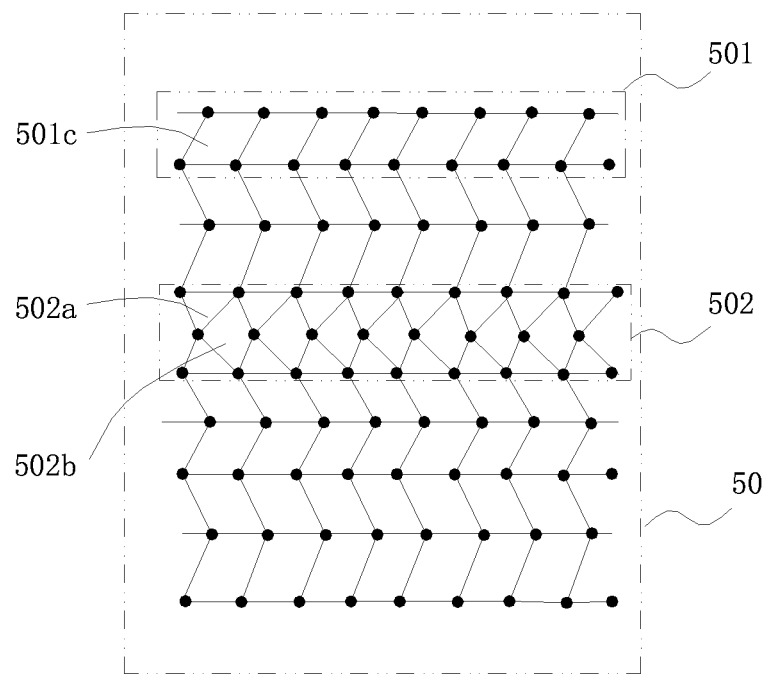
FIG. 11 is a schematic view of an aerodynamic configuration adjuster including multiple grid cells of a parallelogram shape.

In FIG. 11, the adjustment grid layer 501 is formed by connecting multiple parallelogram grid cells 501c in the same direction. The adjacent parallelogram cells 501c may share an oblique side or two independent oblique sides are connected to each other. The "connecting" described herein is to facilitate understanding of the positional relationship of two parallelogram grid cells 501c, and does not limit the two parallelogram grid cells 501c to be connected by a connecting member, and the grid-like structure may be an integrated structure. When the airflow passes through the leftmost parallelogram grid cell 501c, under the action of the downwind oblique trip line (or rib line) formed by the left side of the grid cell, the attack angle of the airflow is changed; and after being reacted by the oblique trip line, the airflow overturns the oblique trip line and rises toward the upper right of the oblique trip line of the surface of the enclosure structure. It should be understood that the thickness of the airflow boundary layer is about 1 to 2mm When the parallelogram has a certain transverse width, the airflow boundary layer with the upward attack angle will be returned to the horizontal direction by the main airflow outside the boundary layer, which will be repeated and similar to the airflow path guided by the isosceles triangle grid cells in the embodiment of FIG. 6, that is, the aerodynamic configuration is also an approximate ellipse converged at the leeward surface and the downstream of the enclosure structure.

Of course, the isosceles triangle grid cell may more reliably achieve the airflow to flow upward and then return to the substantially horizontal direction. Moreover, for the transverse adjustment grid layer 501 formed by the connection of the normal isosceles triangle grid cell 501a and the inverted triangle grid cell, no matter what the upwind direction is, it will be adjusted according to the a, b, and c processes described above.

Accordingly, when the adjustment grid layer 501 includes multiple parallelogram grid cells 501c, it can be designed as two upper and down adjacent adjustment grid layers 501, and the parallelogram grid cells of the two upper and down adjacent adjustment grid layers 501 are arranged inversely, as shown in FIG. 11. In this way, even if the width of the parallelogram grid cell 501c does not satisfy the outer airflow to carry the airflow with the changed attack angle to the horizontal direction, it is beneficial to the airflow with the changed attack angle to return to the originally horizontal direction since the guiding directions of the upper and lower parallelogram grid cells 501c are inconsistent, which allows the upper and lower quadrilateral grid cells 501c each to locally change the direction of the airflow attack angle along the direction of the incoming flow, breaks the local correlation of the airflow on the outer surface of the enclosure structure, suppresses the occurrence of the Karman vortex street phenomenon, prevents the simultaneity of the vortex street phenomenon on the surface of the enclosure structure in the height direction, and breaks the consistency of the vortex frequency when the vortex street phenomenon occurs. Even if the vortex street phenomenon occurs on the surface of the enclosure structure in the height direction at the same time, it is difficult to form a crosswind force with sufficient size to induce transverse vibration of the enclosure structure due to the opposite or inconsistent phase. Although the occurrence of the vortex street phenomenon cannot be prevented in fact, this structure can completely break the correlation and consistency of the frequency and the phase of the local vortex street phenomenon and completely prevent the occurrence of vortex-induced vibration.

Figure 12:
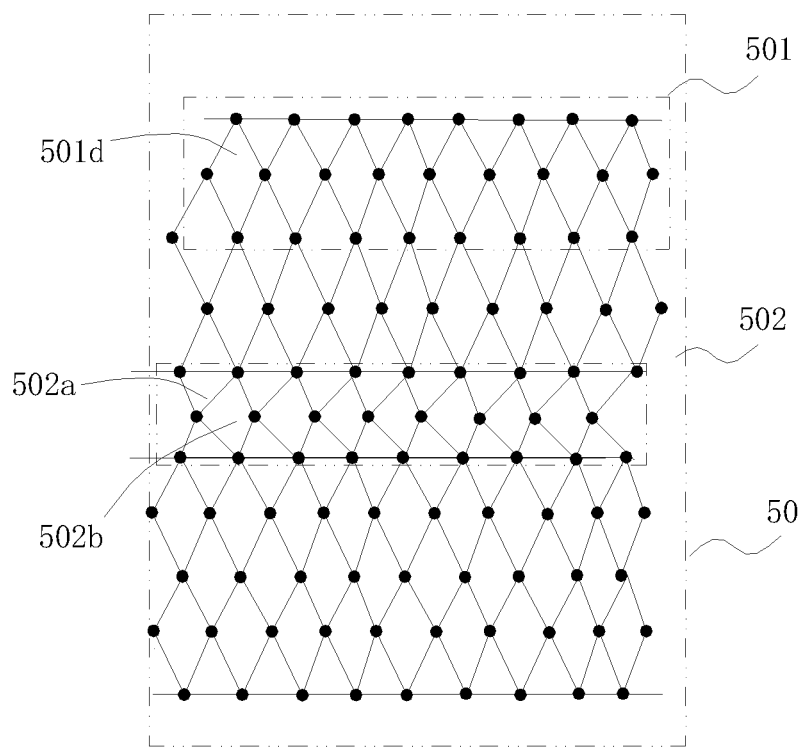
FIG. 12 is a schematic view of an aerodynamic configuration adjuster including multiple grid cells of a rhombic shape.

Referring to FIG. 12, FIG. 12 is a schematic view of an aerodynamic configuration adjuster 50 including rhombic grid cells 501d.

Compared with the embodiment of the isosceles triangular grid cells, the rhombic grid cells 501d can achieve a similar change in the attack angle, adjusting the aerodynamic configuration to an approximate ellipse, but the isosceles triangle is provided with a base, and the airflow direction in each layer adjustment grid layer 501 is more controllable, which can better ensure that the aerodynamic configuration changes according to the method of FIG. 7.

It can be understood that the above isosceles triangle grid cells, parallelogram grid cells 501c, and rhombic grid cells 501d are all provided for the purpose of forming an oblique side as an oblique trip line, in order to realize the purpose of locally changing the attack angle of the airflow, and then changing the global aerodynamic configuration. The transverse adjustment grid layer 501 is provided, and the shape of each grid cell is the same in the adjustment grid layer 501, and then the global change of the aerodynamic configuration is more obvious. Taking the arrangement of the isosceles triangle grid cell and the parallelogram grid cell 501c as an example, the airflow will continue to undergo the process of raising and then adjusting to the horizontal, then the aerodynamic configuration of the airflow when the airflow passes through the whole adjustment grid layer 501 is shown in FIGS. 7 and 8, which is approximately elliptical, and because the airflow is continuously reduced to the horizontal, there is no longitudinal correlation between the multiple adjustment grid layers 501, so that the part of the aerodynamic configuration of the enclosure structure where the aerodynamic configuration adjuster 50 is arranged is adjusted in an orderly manner.

Of course, based on the most basic requirements for changing the attack angle, in the grid structure of the aerodynamic configuration adjuster 50, at least part of the grid cells are required to have an oblique side, which can realize a purpose of reducing the downwind resistance, breaking the correlation between the upper and lower layers of the local airflow, and suppressing the vortex-induced vibration even if the local aerodynamic configuration changes. Of course, multi-layer transverse adjustment grid layers 501 are provided, and the adjustment grid layers 501 include multiple grid cells that can surround the enclosure structure, the grid cells are provided with the above oblique sides, and each of the adjustment grid layers 50 is provided with the oblique sides with the same oblique direction and the same length, which is beneficial to make the aerodynamic configuration formed when the airflow flows around the whole enclosure structure close to an ellipse, that is, the whole aerodynamic configuration, change, which further ensures that the downwind resistance is reduced and the transverse vortex-induced vibration can be suppressed.

Referring to 5, the aerodynamic configuration adjuster 50 further includes at least one transverse decoupling grid layer 502, the decoupling grid layer 502 is provided between the upper and lower adjustment grid layers 501, and the shape of the decoupling grid layer 502 is different from the shape of the adjustment grid layer 501.

Specifically, in FIG. 5, the decoupling grid layer 502 includes multiple non-isosceles triangle grid cell groups, and the non-isosceles triangle grid cell group includes two non-isosceles triangle grid cells of the same shape and opposite apex angles 502a; the base of each the non-isosceles triangle grid cell 502a is the base of two adjacent isosceles triangle grid cells of the adjacent adjustment grid layer 501. Furthermore, a non-equilateral quadrilateral grid cell 502b is formed between two adjacent non-isosceles triangular grid cell groups. The non-isosceles triangular grid cell 502a includes a base and a short side and a long side on both sides. The two adjacent sides on the left side of the non-quadrilateral grid cell are the long sides of two adjacent non-isometric triangle grid cells 502a, and the two adjacent sides on the right side are the short sides of two adjacent non-isosceles triangular grid cells 502a.

It is understood with reference to FIG. 5 that due to the existence of the decoupling grid layer 502, the shape of the grid cells of the decoupling grid layer 502 and the adjustment grid layer 501 are different, thus the adjustment grid layers 501 located above and below the decoupling grid layer 502 are discontinuous in an up and down direction and are disconnected by the decoupling grid layer 502, thereby breaking the upper and lower correlations of the airflow boundary layer, that is, the decoupling grid layer 502 forms a decoupler correlated with the boundary layer of the contact surface of the enclosure structure, thereby further suppressing the transverse vortex-induced vibration.

As shown in FIG. 6, when the airflow passes through the decoupling grid layer 502, the attack angle is changed by the oblique side of the non-isosceles triangular grid cell 502a, and the local aerodynamic configuration is changed. The short and long sides of the non-isosceles triangle are asymmetric, and the positive attack angle (airflow flowing upward) and negative attack angle (airflow flowing downward) generated when the airflow passes are different, which is completely different from the adjustment of the attack angle of the upper and lower adjustment grid layer 501, and the correlation is broken.

Correlation is an important characteristic of pulsating wind. Here the correlation is related to pulsating wind speed at two points in space or pulsating pressure at two points at different heights on the surface of the tower 10.

The correlation coefficient p is defined as $$\rho = \frac{\overline{u'(Z_1)u'(Z_2)}}{\sigma_u(Z_1)\sigma_u(Z_2)}.$$

At two different heights $(Z_1, Z_2)$, the covariance of the pulsating wind speed is defined as follows:

$$\overline{u'(Z_1)u'(Z_2)} = \frac{1}{T}\int_0^T [U(Z_1, t) - \overline{U}(Z_1)][U(Z_2, t) - \overline{U}(Z_2)]dt$$

Therefore, the covariance is the time average of the product of pulsating wind speeds at two heights. Each wind speed value on the right side of the equation subtracts the respective average sum $\overline{U}(Z_1)$ and $\overline{U}(Z_2)$, U $(Z_1, t)$ is the wind speed value at time t and height $Z_1$, and $U(Z_2, t)$ is the wind speed value at time t and height $Z_2$, that is, the wind speed at different height positions at the same time.

Mathematically, the formula for the standard deviation can be written as:

$$\sigma_u = \left\{\frac{1}{T}\int_0^T [U(t) - \overline{U}(Z)]dt\right\}^{\frac{1}{2}},$$

where, U(t) is the wind speed component in the direction of the average wind speed, which is equal to $\overline{U}(Z)+u(t)$; and u(t) is the downwind turbulent component, that is, the pulsating wind speed component in the average wind speed direction.

The numerator of the correlation coefficient ρ definition formula refers to the covariance of the pulsating wind speed of the tower 10 at two different heights $(Z_1, Z_2)$, and T refers to the period of calculating the average value.

Covariance is the time average of the product of pulsating wind speeds at two heights.

The total intensity of the turbulence can be measured by the standard deviation or root mean square of the wind speed, the average component is subtracted from the wind speed, and then the deviation is used for quantifying the remaining part, the deviation is squared and then averaged, and finally the square root is derived to obtain a physical quantity with the wind speed unit, and the standard deviation is obtained. Defined by the correlation coefficient, the correlation coefficient between the two wind speeds at different heights is obtained by the covariance of the wind speed at different heights divided by the standard deviation, the smaller the correlation, the better, which hinders the frequency of the vortex at different heights after the vortex is formed and breaks the frequency consistency to the accumulation and growth of vortex-induced resonance energy, that is, preventing the growth of the vortex-induced resonance, even leading the vortex-induced resonance to disappear.

The mean square value of the total pulsating wind force on the structure surface of the tower 10 is $\overline{F'^2}=f[\rho(y_i-y_j)]$, $y_i$ `$y_j$ are two points in the vertical height direction of the surface of the tower 10, and $\rho(y_i-y_j)$ is the correlation coefficient of the pulsating wind between the sections of $y_i$ `$y_j$.

Furthermore, as shown in FIG. 6, after the airflow passing through two non-isosceles triangular grid cells 502a and entering the non-equilateral quadrilateral grid cells 502b, the non-equilateral quadrilateral grids form a "hollow", so that the entering airflow is buried in the hollow, it is difficult to continue to move forward, the local resistance is reduced, and it has a certain resistance reduction function; moreover, the airflow is blocked in the hollow, which also cuts off the growth of the boundary layer, and the airflow vortexes in the non-equilateral quadrilateral grid cells 502b to form turbulence, and the airflow can only continue to overturn into the next group of non-isosceles triangular grid cells 502a by the external airflow of the airflow boundary layer, and the attack angle is changed again by the oblique side, which cycles many times like this.

It can be seen that the decoupling grid layer 502 of this structure can not only play the role of breaking the upper and lower correlations, but also change the local attack angle and reduce the resistance, and the boundary layer is continuously destroyed and re-grown. It also avoids the phenomenon that the growing boundary layer sheds to a certain degree, thereby suppressing the transverse vortex-induced vibration.

The above decoupling grid layer 502 is also adapted to the embodiments of the parallelogram grid cell 501c and the rhombic grid cell 501d. As shown in FIGS. 11 and 12, the base of the non-isosceles triangle grid cell 502a coincides with the base of the parallelogram grid cell 501c, and the two nodes 50a of the base of the non-isosceles triangular grid cell 502a are in correspondence with the top nodes 50a or the bottom nodes 50a of two adjacent rhombic grid cells 501d.

The decoupling effect of the decoupling grid layer 502 is mainly to break the upper and lower correlation, as long as the effect on the airflow is different from the upper and lower adjustment grid layer 501, thus it is not limited to the structure of the decoupling grid layer 502 shown in FIG. 5. It may be any other shapes of the grid cells different from the adjustment grid layer 501. In addition, the purpose of the above non-equilateral quadrilateral is to form hollows (or cavities) to resistance the airflow, and cut off the growth of the boundary layer on the surface of the enclosure structure by means of the trip lines or ribs of the non-equilateral quadrilateral to reduce the wind resistance of the airflow flowing around the enclosure structure. In order to realize the purpose, the non-equilateral quadrilateral may be formed into a pentagon, hexagon, octagon, etc., which is not limited in this solution, and the whole decoupling grid layer 502 may be in a shape of an equal hexagon (honeycomb).

Further, as shown in FIG. 4, the grid-like structure is provided with multiple nodes 50a, and each of the nodes 50a is a ball or a semi-spherical ball or rugby ball facing outward. In this way, the nodes 50a can act as trip balls, that is, when the airflow passes through the nodes 50a, the airflow will be tripped by the spherical structure of the nodes 50a, which is also conducive to the formation of turbulence, thereby preventing the boundary layer from shedding due to the growth of the boundary layer and inhibiting the transverse vortex-induced vibration. The size of the trip ball of each node 50a may be the same or different. In addition, the trip ball may be a solid structure or a hollow structure, and the volume of the trip ball may also change dynamically under the action of pressure. Moreover, as described below, when applied to the enclosure structure of the marine construction or other enclosure structure of the aquatic construction with underwater parts, the trip ball has a certain volume and may generate buoyancy (when the trip ball is hollow, the buoyancy is greater), which helps maintain the shape of the grid cells of the grid-like structure.

Figure 13:
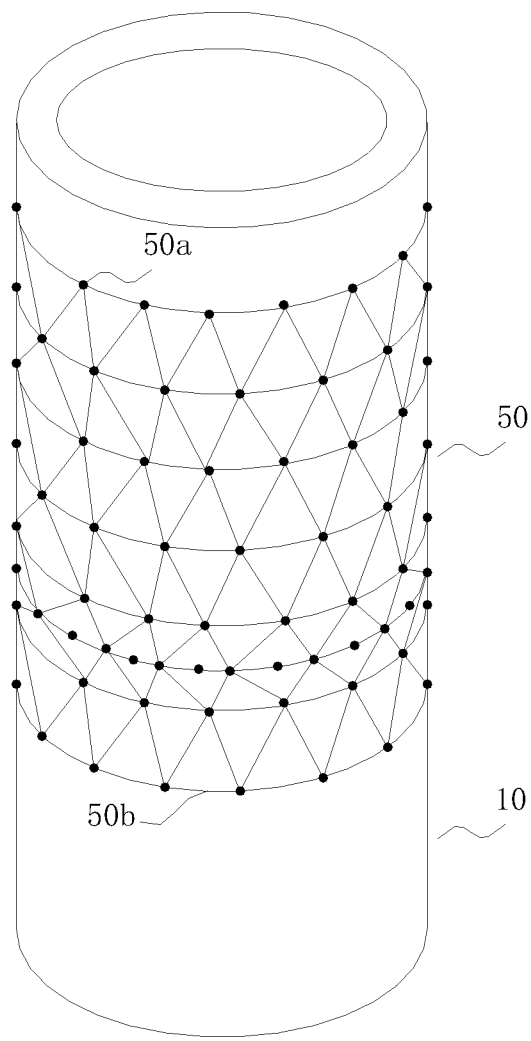
FIG. 13 is a schematic view of another embodiment of the tower section provided with the aerodynamic configuration adjuster in FIG. 3.

Accordingly, referring to FIG. 13, FIG. 13 is a schematic view of another embodiment of the tower section provided with the aerodynamic configuration adjuster 50 in FIG. 3.

In the decoupling grid layer 502 of this embodiment, the vertex angles of the two non-isosceles triangle grid cells 502a of each non-isosceles triangle grid cell group are provided with a node 50a, the nodes 50a of multiple groups of the non-isosceles triangle grid cell groups are connected, and a connected grid line is provided with a trip ball having the same structure with the node 50a in the non-equilateral quadrilateral grid cell 502b, so that the airflow entering the non-equilateral quadrilateral grid unit 502b is tripped by the trip ball, and the turbulent flow is maintained within the non-equilateral quadrilateral grid cell 502b, thereby the amount of turbulent flow is increased and the resistance is reduced.

For the above embodiment, the oblique side in the grid cell is used for changing the attack angle of the airflow boundary layer. Therefore, the size of the oblique side can be determined according to the thickness of the airflow boundary layer. Specifically, according to the meteorological data collected by the wind resources, the thickness of the airflow boundary layer can be obtained within the set wind speed range. Taking the tower 10 as an example, within the range of the wind speed allowing the tower 10 to be hoisted and based on the meteorological data collected by the wind resources, the range of the thickness of the airflow boundary layer of each section of the tower 10 can be calculated and obtained as the equivalent diameter of the grid cell. In addition, the size of the grid cell is also designed to obtain the required resistance reduction in the downwind direction and the vortex-induced vibration suppression effect to determine the height of the grid cell, the base angle of the isosceles triangle, the parallelogram, and the rhombic in the above embodiment.

Referring to FIG. 6, in this embodiment, the grid structure of the aerodynamic configuration adjuster 50 may be a flexible grid, which may be expanded and contracted along the height direction to change the height of the grid cell, and the height is the span of the grid cell in the vertical direction after the grid-like structure surrounds the enclosure structure of the tower, for example, when the grid cell is an isosceles triangle, it is the height of the isosceles triangle. It can be seen that when the height is changed, the cross-sectional area of the grid line of the grid cell also changes. When the height is increased, the cross-sectional area becomes smaller, and the tightness of the grid-like structure will be tighter, so that the structure is tightened on the outer surface of the enclosure structure of the tower 10. When the height of the grid cell decreases, the cross-sectional area of the grid line increases accordingly.

As mentioned above, in order to realize the purpose of resistance reduction and vibration reduction, the size of the grid cell can be designed according to the actual situation. As shown in FIG. 3, from top to bottom, the height of the grid cell increases, and when the grid cell is an isosceles triangle, the base angle also increases. The higher the position, the wind speed tends to be greater. To achieve the effect of reducing downwind resistance and suppressing vortex-induced vibration, the length of the oblique side should be short, the height of the isosceles triangle is small; and in a downward direction, the height is higher, and the length of the oblique side is longer. If the grid-like structure is designed as a flexible or elastic grid, according to the difference in height, the height dimension of the grid cell and the cross-sectional area of the grid line of the corresponding section and the bottom angle (triangle, parallelogram, rhombic, etc.) may be adjusted to adapt to the change in wind speed, thereby changing the aerodynamic configuration when the airflow flows around the enclosure structure.

Specifically, the base of the grid-like structure may be designed as a pulling ring 50b that may surround the enclosure structure to pull the grid cells. The grid-like structure may be formed by weaving a wire rope, or by a molding process, or by 3D printing. The pulling ring 50b may be a part with a certain weight, such as an iron ring, a heavy plastic ring, etc., so as to pull or retract the grid-like structure to change the grid cell. For example, after the grid-like structure is pulled, the cross-sectional area of the grid line itself becomes smaller, the grid line becomes thinner, and the grid cell area can be increased. After the grid-like structure is pulled by the pulling ring 50b, the pulling ring 50b may be detachably secured to the outer surface of the enclosure structure of the tower 10, so as to maintain the shape and size of the grid cell after the pulling, and it also facilitates reusing after disassembly.

Of course, the pulling ring 50b may also be provided on the top side of the grid-like structure, and may also pull the grid cell to adjust the height of the grid cell. When the above aerodynamic configuration adjuster 50 is provided in the industries of bridges and high-speed rails (such as the land-type piers or pillars described below), it is easier to operate by pulling upward.

Above, the pulling ring 50b may be manually pulled. Alternatively, a pulley mechanism or a traction mechanism may be provided to drive the pulling ring 50b to move up and down to a desired position, so as to adjust the height of the grid cell, the cross-sectional area of the grid line, etc. to the expected value.

The grid-like structure may be detachably connected after surrounding the enclosure structure. Taking the tower 10 as an example, before being hoisted and assembled, the grid-like structure may be bound to the surface of the tower section. After the hoisting and assembly are completed, the grid structure may be disassembled and reused, or may continue to be bound to the tower 10 to continue to play the function of reducing downwind resistance and suppressing the vortex-induced vibration.

The enclosure structure in the above embodiment is illustrated by taking the tower 10 as an example. It can be understood that any building-type enclosure structure similar to the tower 10, such as a TV tower and a wind tower, can be equipped with the above-mentioned aerodynamic configuration adjuster 50 on the outer surface. The enclosure structure may also be a land pillar piers or pillars, for example, road or railway bridges in a canyon will be provided with land pillar piers or pillars. Land-type bridge piers or pillars will be in the wind flow field and face the vibration problems, and may also be provided with the above grid-like structure.

The enclosure structure may also be a marine construction, which faces the erosion of seawater. When the aerodynamic configuration adjuster 50 is arranged on the outer surface of the underwater portion of the marine construction, the aerodynamic configuration may also be changed when the water flows around the underwater portion, then the resistance acting on the position of the facing flow surface of the marine construction may be reduced, and the vibration may be suppressed, and the principle is the same as the above embodiment. The marine construction is such as sea lighthouses, lookouts, bridge piers across the sea, dams and embankments along the coast, and such as wind turbine foundation for the sea wind turbine extending below sea level and plunging into submarine silt. The aerodynamic configuration adjustment is the aerodynamic configuration when the water flows around the solid surface, that is, the solution is not limited to adjusting the aerodynamic configuration when the airflow around the solid surface, as long as it is the aerodynamic configuration when the fluid flows. In addition to the enclosure structure on the sea (ie marine construction), for other enclosure structures of the aquatic construction with underwater construction parts in rivers and lakes, the aquatic construction has at least an underwater part, and the above aerodynamic configuration adjuster may be mounted on the underwater part. The principle is the same as the above and will not be repeated.

In addition, as mentioned above, the vibration of the upper part of the enclosure structure is more obvious, so that at least the outer surface of the upper part of the enclosure structure is provided with the aerodynamic configuration adjuster 50. In FIG. 3, only the upper part is provided with the aerodynamic configuration adjuster 50, and the upper part is located above the ½ height of the tower, and it is obviously feasible that the whole part is provided with the aerodynamic configuration adjuster 50. When the enclosure structure is the tower 10, the height of the annular arrangement of the aerodynamic configuration adjuster 50 is not less than the length of the blade.

Since the absorption pressure pulsation causes the pulsatility of the bending moment, in the downwind direction, of the corresponding blade when the blade passes in front of the tower 10 to decrease, the pulsation transmitting to the blade root through the impeller causes fatigue damage to the pulsating load of the pitch bearing. These hidden fatigue hazards have existed in the field of the wind power for a long time. According to this solution, the outer surface of the tower 10 is provided with the aerodynamic configuration adjuster 50, which can reduce the downwind resistance, reduce the pressure difference between the windward surface and the leeward surface, reduce the downwind pitch amplitude of the tower due to the pressure difference acting on the windward surface and leeward surface of the tower, reduce the reaction force of the windward surface of the tower against the incoming flow from the upwind direction and reduce the change frequency of the reaction force of the windward surface against the incoming flow from the upwind direction, so that the pressure pulsation of the airflow at the position where the blade passes in front of the windward surface of the tower is reduced, therefore, the situation that the pulsation pressure acting on the blade when the blade passes in front of the tower 10 is reduced, and the bending moment pulsation of the force on the blade to the pitch bearing bolt connection at the blade root is reduced, and the pulsatility of the bending moment at the pitch bearing and the fatigue damage caused by the load are reduced.

In summary, the technical solution of this embodiment uses the grids, the boundary layer formed by the grids changing the external flow field of the enclosure structure of the wind turbine tower, and the aerodynamic configuration formed by changing the motion of the boundary layer to reduce the downwind load of the load-bearing enclosure structure and to suppress the vibration of the tower structure. Overall, through the grid structure, the aerodynamic coefficient C of the flowing airflow becomes small, and the amplitude of the vortex-induced resonance is reduced, which protects the stability and safety requirements of the load-bearing enclosure structure during the hoisting and assembly.

The research process found that when the enclosure structure of the tower absorbs energy from the vortex with the same frequency as the structure, the structural vibration configuration of the enclosure structure may change, and the changed enclosure structure may have an effect on the airflow, making the energy concentrated on the fundamental frequency of the enclosure structure become larger and larger, thereby exciting the vortex-induced resonance of the tower structure. When the incoming flow from the upwind direction has a certain intensity of turbulence, the incoming flow already has energies of various frequency components, and these energies are more dispersive and pulsating. The incoming flow has carried vortices of various energies, and when the airflow passes through the outer surface of the enclosure structure, the integration of the outer surface structure on the upwind incoming flow occurs on the basis that there is already a vortex in the incoming flow. Therefore, based on the chaotic incoming flow, the grid structure is used for reconstructing and consuming the incoming flow at the boundary layer, which becomes a vortex that is different from the fundamental vibration frequency of the enclosure structure.

In addition, the decoupling grid layer 502 is used for breaking the correlation between the upper and lower airflows of the correlated boundary layers, forming a decoupler correlated with the contact surface boundary layer of the load-bearing enclosure structure of the wind power tower, suppressing the development of the vortex street, suppressing the formation of the vortex street, and preventing and suppressing the vortex-induced vibration of the tower structure in the crosswind direction, which guarantees the safety of the enclosure structure in the wind field, such as providing guarantee measures and improving wind energy utilization factor for the mounting and subsequent operation of the generator and wind turbine structure after the mounting of the tower 10 and the nacelle 20.

Moreover, the solution of this embodiment does not increase excessive cost on the premise of achieving the above technical effects. The aerodynamic configuration adjuster 50 is a grid-like structure, which may be a general nylon rope net, the cost is very low, and the tooling is removable, easy to reuse, easy to recycle, and does not obviously occupy the space and volume of recycling transportation vehicles, which reduces the recycling cost.

The wind farms are constructed in high-altitude areas of Yun, Gui, and Sichuan in southern China, which requires to constructing roads around high mountains, the hoisting period on the high mountains is usually longer, the uncertainty of wind will affect the hoisting construction at any time, and the cost of hoisting is higher. In order to save time and shorten the waste caused by the delay of the construction period due to the uncertainty of the wind and the delay of the grid-connected power generation of the wind turbine, this solution is proposed to solve the damage and hidden dangers of the tower foundation connection caused by the sloshing of the tower structure itself during the hoisting process. On the other hand, it is also suitable for use in marine wind turbines that the on-site hoisting progress and mounting period are obviously restricted by the local wind conditions. The inventor of this application investigated the construction of the wind farms in high-altitude and high-mountain regions and innovated the technical routes and methods for hoisting large components of wind power generation equipment to solve the technical obstacles faced by such on-site mounting. Correspondingly, the technical route of the solution of this embodiment can ensure or strive for the reliable hoisting of the nacelle when the wind speed is less than 8 m/s; and the hoisting of the tower when the wind speed is less than 10 m/s. The purpose of the present application is to improve the damage and hidden danger of the foundation connection of the tower caused by the wind-induced sloshing of the tower of the load-bearing structure of the wind turbine during the hoisting process, and to reduce the construction cost.

The above are only preferred embodiments of the present application. It should be noted that, for the person skilled in the art, a few of modifications and improvements may be made to the present application without departing from the principle of the present application, and these modifications and improvements are also deemed to fall into the scope of the present application defined by the claims.

The invention claimed is:

1. An aerodynamic configuration adjuster arranged on an outer surface of an enclosure structure, wherein the aerodynamic configuration adjuster has a grid-like structure configured to surround the enclosure structure, the grid-like structure comprises a plurality of grid cells, at least part of the grid cells have an oblique side, and an attack angle changes when a fluid passes through the oblique side; wherein
the aerodynamic configuration adjuster comprises a plurality of vertically distributed adjustment grid layers and at least one decoupling grid layer, the at least one decoupling grid layer is provided between two of the plurality of adjustment grid layers arranged in an upper and lower direction, and a shape of the decoupling grid layer is different from a shape of each of the plurality of adjustment grid layers.

2. The aerodynamic configuration adjuster arranged on the outer surface of the enclosure structure according to claim 1, wherein the adjustment grid layers are configured to surround the enclosure structure, the adjustment grid layers comprise the plurality of grid cells, the plurality of grid cells has the oblique side, and the adjustment grid layers have a plurality of oblique sides with a same oblique direction and a same length, and when the fluid passes through the plurality of oblique sides, the aerodynamic configuration is approximately of an elliptical shape.

3. The aerodynamic configuration adjuster arranged on the outer surface of the enclosure structure according to claim 2, wherein each grid cell in a same adjustment grid layer has a same shape and size; or each grid cell in all the adjustment grid layers has a same shape and size.

4. The aerodynamic configuration adjuster arranged on the outer surface of the enclosure structure according to claim 3, wherein each grid cell of the adjustment grid layers is of an isosceles triangle shape, and each of the adjustment grid layers is formed by connecting a normal isosceles triangle grid cell and an inverse isosceles triangle grid cell in sequence; or,
each grid cell of the adjustment grid layers is of a parallelogram shape, and each of the adjustment grid layers is formed by connecting a plurality of parallelogram grid cells with a same oblique direction; or,
each grid cell of the adjustment grid layers is of a rhombus shape, and each of the adjustment grid layers is formed by connecting a plurality of rhombic grid cells.

5. The aerodynamic configuration adjuster arranged on the outer surface of the enclosure structure according to claim 3, wherein all the grid cells in the adjustment grid layers are the same, and a shape of each grid cell in the decoupling grid layer is different from a shape of each grid cell in the adjustment grid layers.

6. The aerodynamic configuration adjuster arranged on the outer surface of the enclosure structure according to claim 4, wherein
the decoupling grid layer comprises a plurality of non-isosceles triangle grid cell groups, and each of the non-isosceles triangle grid cell groups comprises two non-isosceles triangle grid cells with a same shape whose vertex angles are opposite; a base of each non-isosceles triangle is a base of the corresponding grid cell of the adjacent adjustment grid layer; and a non-equilateral quadrilateral grid cell is formed between two adjacent non-isosceles triangle grid cell groups.

7. The aerodynamic configuration adjuster arranged on the outer surface of the enclosure structure according to claim 6, wherein, in the decoupling grid layer, the vertex angles of the two non-isosceles triangle grid cells of each non-isosceles triangle grid cell group form a node, the nodes of a plurality of groups of the non-isosceles triangle grid cell groups are connected, and a connected grid line is provided with a trip ball in the non-equilateral quadrilateral grid cell.

8. The aerodynamic configuration adjuster arranged on the outer surface of the enclosure structure according to claim 4, wherein, in two adjacent adjustment grid layers in an upper and lower direction, the parallelogram grid cells are arranged inversely.

9. The aerodynamic configuration adjuster arranged on the outer surface of the enclosure structure according to claim 1, wherein the grid-like structure is provided with a plurality of nodes, and each of the nodes is a ball or a semi-spherical ball or a rugby ball facing outward, forming a trip ball.

10. The aerodynamic configuration adjuster arranged on the outer surface of the enclosure structure according to claim 9, wherein a cross section of grid lines of the grid-like structure is a quadrilateral or a circle.

11. The aerodynamic configuration adjuster arranged on the outer surface of the enclosure structure according to claim 1, wherein the grid-like structure is a flexible or elastic grid, which is stretchable in a height direction, to change a height of each grid cell and a cross-sectional area of the grid lines of the grid-like structure.

12. The aerodynamic configuration adjuster arranged on the outer surface of the enclosure structure according to claim 11, wherein a pulling ring configured to surround the enclosure structure is provided at a base or a top side of the grid-like structure to pull the grid cell and adjust the height of each grid cell.

13. The aerodynamic configuration adjuster arranged on the outer surface of the enclosure structure according to claim 11, wherein the grid-like structure is detachably connectable after surrounding the enclosure structure.

14. An enclosure structure, wherein at least part of an outer surface of the enclosure structure is provided with the aerodynamic configuration adjuster arranged on the outer surface of the enclosure structure according to claim 1.

15. The enclosure structure according to claim 14, wherein the enclosure structure is a tower of a wind turbine, a television tower, an anemometer tower, or an aquatic building with an underwater part, or a land pillar pier, or a land pillar.

16. The enclosure structure according to claim 15, wherein a height of each grid cell gradually increases from top to bottom; and at least an outer surface of an upper part of the enclosure structure is provided with the aerodynamic configuration adjuster, and the upper part is located above ½ of a height of the tower.

17. The enclosure structure according to claim 16, wherein the enclosure structure is the tower of the wind turbine and a height of the aerodynamic configuration adjuster is not less than a length of a blade.

* * * * *